United States Patent
Waldrop (10) Patent No.: US 6,194,938 B1
(45) Date of Patent: Feb. 27, 2001

(54) SYNCHRONOUS INTEGRATED CLOCK CIRCUIT

(75) Inventor: Willaim C. Waldrop, Denham Springs, LA (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/400,696

(22) Filed: Sep. 22, 1999

Related U.S. Application Data (60) Provisional application No. 60/102,029, filed on Sep. 28, 1998.

(51) Int. Cl.[7] .................................................. G06F 1/04
(52) U.S. Cl. ........................ 327/291; 327/294; 327/237; 327/163; 327/233
(58) Field of Search ..................... 327/161, 162, 327/163, 291, 292, 293, 294, 232, 233, 234, 237, 250

(56) References Cited

U.S. PATENT DOCUMENTS 5,999,032 * 12/1999 Wang et al. ........................ 327/292

* cited by examiner

*Primary Examiner*—Kenneth B. Wells
*Assistant Examiner*—Cassandra Cox
(74) *Attorney, Agent, or Firm*—Wade James Brady, III; Frederick J. Telecky, Jr.

(57) ABSTRACT

A synchronous integrated circuit clock circuit is disclosed. The clock circuit (200) receives a system clock (CLKX) and in response thereto, generates an internal clock (CLKI) that is shifted forward in phase with respect to the system clock signal (CLKX). The amount by which the internal clock (CLKI) is shifted remains relatively constant over a range of system clock (CLKX) frequencies. The clock circuit (200) includes a measuring section (202) that measures the period of the system clock (CLKX), a logic section (204) that determines a delay value based upon the duration of the system clock (CLKX) period, and a generation section (206), that provides the internal clock signal (CLKI).

29 Claims, 8 Drawing Sheets

SYNCHRONOUS INTEGRATED CLOCK CIRCUIT

This application claims priority under 35 USC §119(e)(1) of provisional application No. 60/102,029 filed Sep. 28, 1998.

TECHNICAL FIELD

The present invention relates generally to semiconductor integrated circuits, and more particularly to timing circuits for use with synchronous semiconductor devices.

BACKGROUND OF THE INVENTION

As the power of computing systems and density of memory storage devices continues to increase, a limiting factor on the performance of a computing system is the data bandwidth (rate of data transfer) between a computing device and an associated memory. One way to increase the bandwidth of a data bus (a collection of lines carrying data signals) is to improve the efficiency of the bus, for example, by minimizing the amount of time the bus is idle. Synchronous systems provide one way to increase bus efficiency.

Synchronous systems include a number of devices that operate in synchronism with a system clock. For example, a synchronous memory device can be configured to provide output data a set number of clock cycles following the application of an address. Thus, devices that read data from such a memory (such as a microprocessor, or the like) do not have to monopolize the data bus following a read command, as they will know exactly when the data will be available. For even more efficient transfer of data, a synchronous memory devices can include a burst mode. In a burst mode, data can be read from, or written to the device, on consecutive memory cycles.

Because synchronous devices usually utilize the system clock for internal timing, a limitation on synchronous device operation can occur due to propagation delay of the clock signal through the device. For example, a synchronous memory device could buffer a system clock signal to generate an internal clock signal. Input/output (I/O) circuits, which control the input and output of data into the memory device, are controlled by the internal clock signal. Due to the physical layout of the device, and the circuits within the memory device that drive the internal clock, the internal clock signal is delayed with respect to the system clock signal. Consequently, the activation of the I/O circuits will be correspondingly delayed with respect to the system clock signal. Thus, while other synchronous devices will be expecting a data access according to the system clock, actual data access is delayed with respect to the system clock.

One way to overcome propagation delay in an internal clock, is to maintain the internal clock at the system clock frequency, but phase shift the internal clock forward. Using the example described above, the semiconductor device would receive the system clock and phase shift it forward. Thus, the I/O circuits would be activated in nearly exact synchronism with the system clock, and data accesses would be possible as expected. The phase shifting of an internal clock can be accomplished with a phase locked loop (PLL) type circuit or a delay locked loop (DLL) type circuit. A PLL would shift an internal clock signal according to the phase difference between it and the system clock. A DLL delays the system clock to such an extent, that the resulting internal clock is effectively shifted forward in time.

Figure 1A:
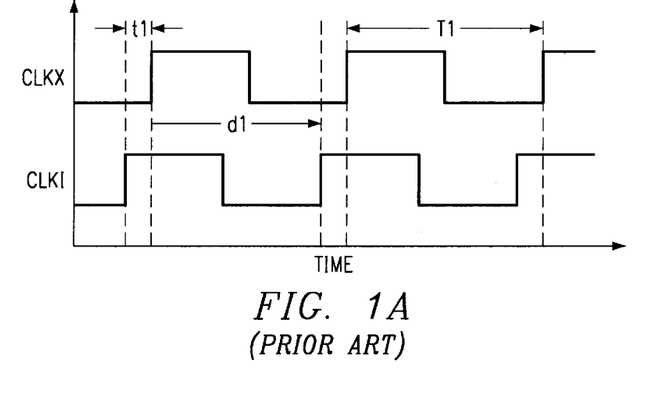
FIGS. 1A and 1B are timing diagrams illustrating the response of a prior art synchronous device clock circuit.

Referring now to FIG. 1A a timing diagram is set forth illustrating an external system clock (shown as CLKX) and a phase shifted internal clock (shown as CLKI). Both clocks have the same period duration, shown as "T1." The CLKI signal is shown to be shifted forward in time with respect to the CLKI signal by an amount "t1." The CLKI can be alternately conceptualized as being delayed in time by the amount "d1" so as to be effectively shifted forward by the amount "t1." It is recalled that the amount t1 is intended to compensate for propagation delay within the memory device. Therefore, internally, functions within the memory device are shifted forward according to the phase shift tl.

A drawback to many PLL and some DLL circuits is that they may require substantial analog circuits. For example, a PLL circuit usually includes a voltage or current controlled oscillator to generate a periodic signal based on a phase shift. Analog circuits may require custom fitting into the layout of a memory device, complicating the design and possibly resulting in wasted space on the device. In addition, analog circuits can be susceptible to noise, producing erroneous responses in noisy environments. A further drawback to analog phase shifting approaches is that such circuits may require a number of clock signals to "lock" into the desired phase shift amount. Thus, a given time period must be allowed following the application of the system clock for an optimal internal clock response.

A limitation of many DLL approaches arises from the fact that the amount by which the system clock is delayed (d1 in FIG. 1A), and hence the amount by which the internal clock is shifted forward (t1 in FIG. 1A), is a fixed portion of the overall system clock period (T1 in FIG. 1A). Such an approach can result in a memory device having a limited system clock frequency operating range. Because the synchronous device functions are optimized for a given phase shift (t1 for example), an increase in the clock period can result in an increase in the phase shift. The synchronous device operation will then lead the system clock. Conversely, if the clock period is decreased, the phase shift is likewise decreased, and the synchronous device operation will lag the system clock.

Figure 1B:
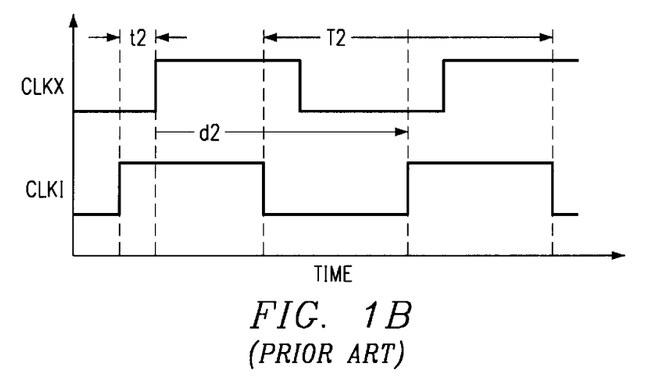

The variance in phase shift caused by DLL circuits employing shifts based on total clock period is best understood by comparing FIG. 1A with FIG. 1B. FIG. 1B is a timing diagram illustrating the system clock CLKX, but at a greater period than that of FIG. 1A. FIG. 1B also includes the resulting internal clock signal, CLKI, created by delaying the CLKX signal (or shifting it forward). It is assumed that the CLKI signal of both FIG. 1A and 1B are generated by delaying their respective system clocks by approximately seven eighths of the total clock period. The resulting phase shift forward is one eighth of the clock period. Because the overall period of the CLKX signal in FIG. 1B is greater than that of FIG. 1A, the amount of phase shift in the CLKI signal of FIG. 1B is greater than that of FIG. 1A (t2>t1). This can be problematic if the device operation is optimized for a propagation delay of t1, but is operating at the clock frequency of FIG. 1B, as the phase shift will be greater than desired.

It would be desirable to generate a clock circuit for a synchronous device that provides an internal phase shifted clock that maintains the same phase shift despite variations in the system clock.

SUMMARY OF THE INVENTION

According to the preferred embodiment, a synchronous device clock circuit generates an internal clock signal that is shifted forward in phase with respect to a system clock. The amount of time by which the internal clock is shifted remains relatively constant over a range of system clock frequencies. The clock circuit includes a measuring section that measures the period of the system clock, a logic section that determines a delay value based upon the length of the system clock, and a generation section that delays the system clock according to the delay value, to provide the internal clock.

According to one aspect of the preferred embodiment, the clock circuit is composed of digital circuit elements, providing for higher noise immunity.

According to another aspect of the preferred embodiment, the generation section includes a series of delay elements that are selectively tapped according to the measured period of the system clock.

According to another aspect of the present invention, the measuring section includes a series of delay elements, each of which provides a particular output timing signal. The delay elements are further connected to one another by connecting gates. The connecting gates are commonly enabled by an initial system clock pulse. When the clock circuit is first activated, a measuring signal propagates through the delay elements, activating the timing signals for the duration of the system clock pulse.

An advantage of the present invention is that it enables a synchronous device to operate over a relatively wide range of system clock frequencies.

Another advantage of the present invention is that it only requires two system clock periods to generate the desired phase shift in the internal clock signal.

DETAILED DESCRIPTION OF THE EMBODIMENTS

The preferred embodiment is a clock circuit that may be used in a synchronous semiconductor device, such as a synchronous dynamic random access memory (SDRAM), as just one example. The preferred embodiment receives a periodic system clock (CLKX) and a series of reset pulses generated when the semiconductor device undergoes a reset operation. In response to these input signals, the clock circuit generates an internal clock signal (CLKI) that has the same frequency as the synchironous system clock, but is effectively shifted forward in phase. The phase shift introduced into the CLKI signal remains generally constant over a wide range of clock frequencies. In the preferred embodiment, the various elements of the clock circuit are implemented using digital circuits, allowing for increased noise immunity, and easier implementation into many existing semiconductor devices.

Figure 2:
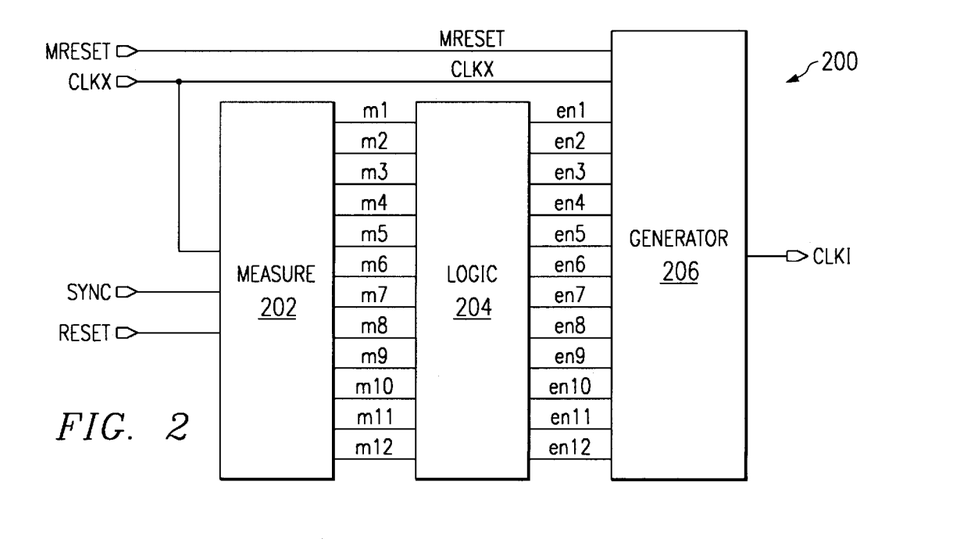
FIG. 2 is a block schematic diagram illustrating a preferred embodiment.

Referring now to FIG. 2, a block schematic diagram is set forth illustrating the preferred embodiment. Preferred embodiment is designated by the general reference character 200, and shown to include a measuring section 202, a logic section 204, and a generation section 206. The measuring section 202 receives the system clock CLKX and two reset signals, shown as RESET and SYNC. The RESET and SYNC signals are only active during a reset operation. When the preferred embodiment 200 is reset, the RESET signal will go high for the first system clock period, and then return low. The SYNC signal will go high for a second system clock period, and then return low.

The measuring section 202 utilizes the RESET pulse to initially discharge various internal nodes of the measuring section 202. The SYNC pulse is used to measure the duration of a half-period of the system clock, and provide an indication of its duration. In the preferred embodiment 200, the measurement indication is a number of measurement signals (m1–m12) provided as outputs from the measurement section 202. A number of consecutive measurement signals (m1–m12) will go high according to the length of the clock half-period. For example, the shortest measurable half-period will result in only the m1 signal going high, while the longest measurable half-period will result in all of the measurement signals m1–m12 going high.

In the preferred embodiment 200, the logic section 202 receives all of the various measurement signals (m1–m12), and provides a number of gate enabling signals signal outputs, shown as en1–en12. The logic section 202 activates one of the enabling signals (en1–en12) according to the measurement signals (m1–m12).

The generation section 206 receives the CLKX signal and a master reset signal, shown as MRESET. In addition the generation section 206 further receives the enabling signals (en1–en12) from the logic section 204. In the preferred embodiment 200, the MRESET signal goes high for two clock periods upon reset, and serves to discharge various nodes within the generation section 206. The generation section 206 takes the CLKX signal, and provides a series of internal clock signals that are phase shifted with respect to the CLKX signal. One of the phase shifted clocks is gated to an internal clock output according to the activated enable signal (one of en1–en12). The internal clock output provides the internal clock signal CLKI.

Figure 3:
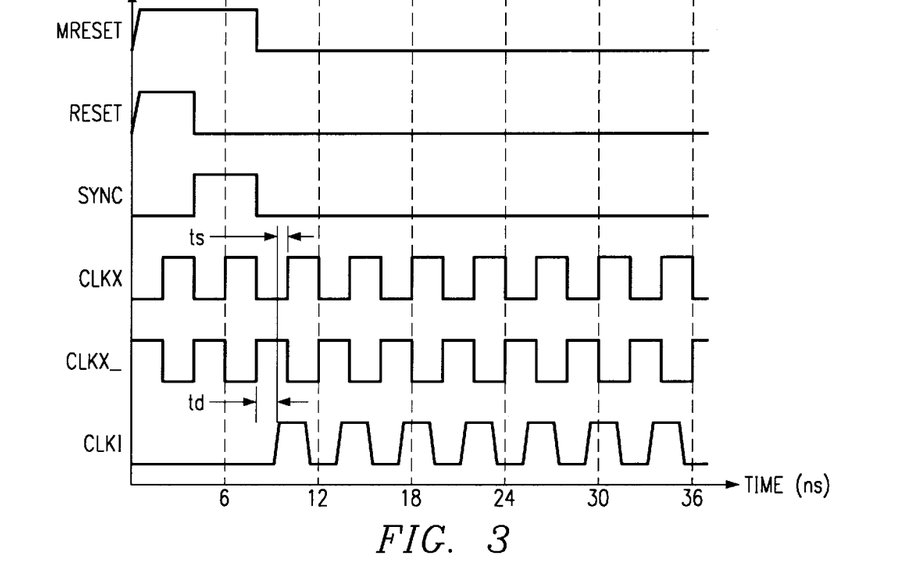
FIG. 3 is a timing diagram illistrating the operation of the preferred embodiment.

Referring now to FIG. 3, a timing diagram is set forth illustrating the operation of the preferred embodiment 200. The reset signals MRESET, RESET and SYNC are shown, along with the CLKX, its inverse CLKX_, and the resulting CLKI signal. The MRESET and RESET signals are both shown to rise at zero nanoseconds, indicating a reset operation at that time. The RESET signal remains high throughout the first period of the CLKX signal, and then falls. As the RESET signal falls, the SYNC signal rises and remains high for the subsequent CLKX cycle. At the end of the second CLKX period, both the MRESET and SYNC signals go low.

The half-period in which both the SYNC and CLKX signals are high is used to measure the duration of the CLKX signal. Thus, only two CLKX periods are required to establish the appropriate enable signal (en1–en12) for the generation section 206, and provide the desired CLKI signal. In this manner the phase shifted internal clock signal CLKI begins to oscillate following the initial two CLKX signal cycles. As noted previously, it is understood that in the preferred embodiment 200, the amount of phase shift between the CLKX signal and the CLKI signal, shown as "ts" in FIG. 3, is generally constant over a wide range of operating frequencies, providing for a versatile clock circuit.

In the preferred embodiment 200, a delay is used to effectively shift the CLKI signal forward in phase with respect to the CLKX signal. This is accomplished by first inverting the CLKX signal, to generate a CLKX_ signal. The CLKX_ signal is then delayed by an amount shown as "td" in FIG. 3, to generate the CLKI signal.

Figure 4:
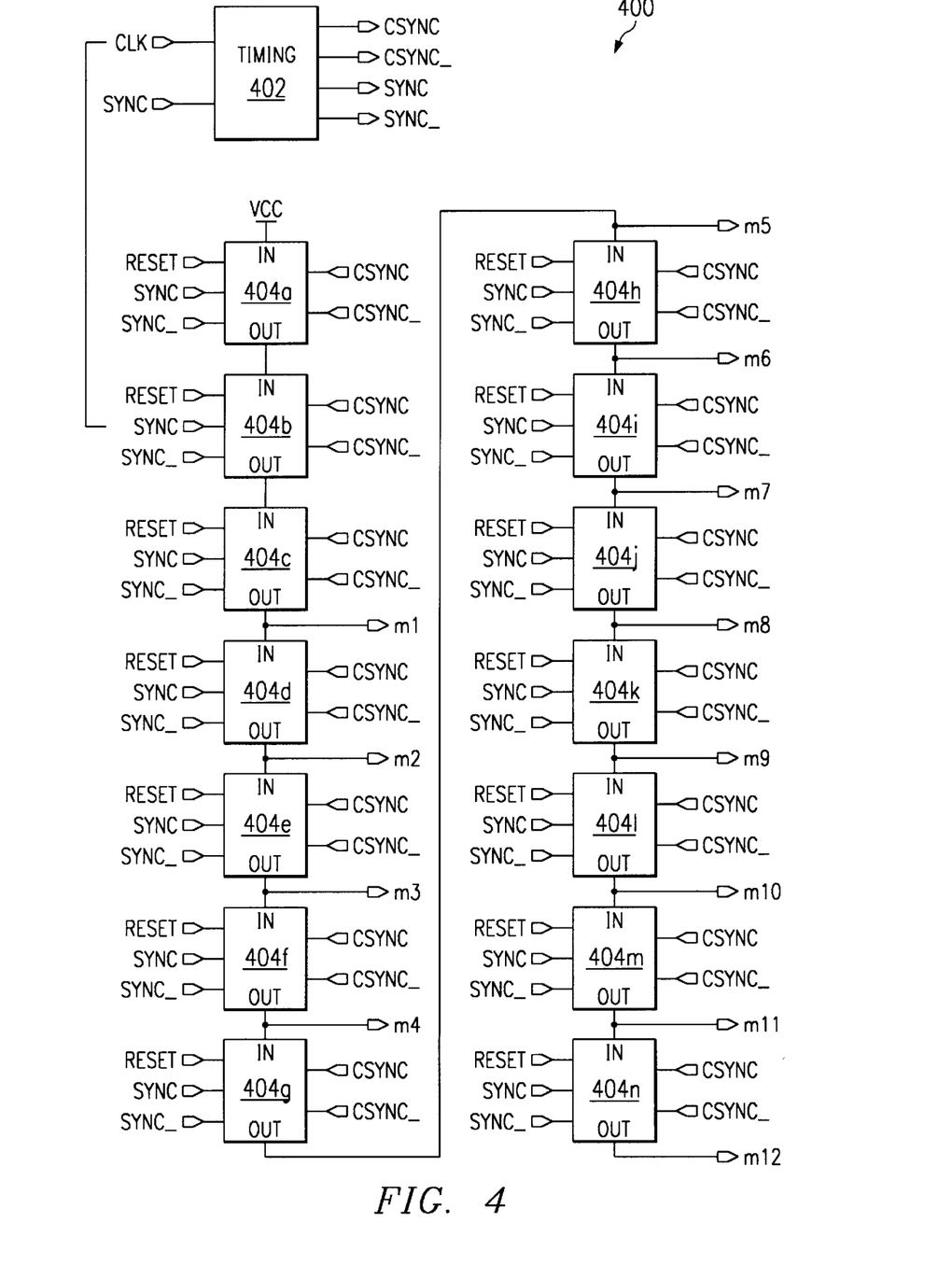
FIG. 4 is a schematic diagram illustrating a measuring section of the preferred embodiment.

Referring now to FIG. 4, a block diagram is set forth illustrating a block schematic diagram of a measuring section. The measuring section is designated by the general reference character 400 and may be used as the measuring section shown as 202 in FIG. 2. The measuring section 400 is shown to include timing control circuit 402 and a number of measuring stages, shown as 404a–404n, arranged in series. The timing control circuit 402 receives the CLKX signal and SYNC signal, and generates two pairs of complementary control signals, shown as CSYNC/CSYNC_ and SYNC/SYNC_. The SYNC signal (and thus the SYNC_ signal) follows the response shown in FIG. 3. The CSYNC signal (and its inverse, CSYNC_), is a pulse that is high when both the SYNC and CLKX signals are high.

The measuring stages (404a–404n) are each controlled by five signals, the SYNC, SYNC_, CSYNC, CSYNC_ and RESET signals. Each measuring stage (404a–404n) receives a signal at an input (IN), and delays the signal to produce a delayed signal at an output (OUT). A signal is allowed to propagate through a measuring stage (404a–404n) only when the CSYNC signal is high. In the preferred embodiment, the SYNC, SYNC_ and RESET signals discharge nodes within each measuring stage (404a–404n).

It is noted that the first measuring stage 404a of the series has an input connected to the high power supply voltage, VCC. The measuring stages (404a–404n) can be conceptualized as including the first stage 404a, which receives a timing signal (the VCC level) at its input, and a plurality of subsequent stages (404b–404n) arranged in series with the first stage 404a.

In the arrangement of FIG. 4, when the CSYNC signal goes high, a high timing signal (generated from the VCC connection to the first measuring stage 404a) will begin racing through the series of measuring stages (404a–404n), generating high measurement signals (m1–m12). The number of measurement signals (m1–m12) that go high will depend upon the duration of the CSYNC signal. For example, if it is assumed that each measuring stage (404a–404n) introduces a delay of an amount "d" and that the CSYNC signal has a duration that is greater than 5d but less than 6d, measurement signals m1–m3 will be activated. The details of this example are as follows. When CSYNC goes high, the VCC signal at the input of measuring stage 404a will begin to propagate through the measuring stage 404a. After a delay d, the high output of measuring stage 404a is received at the input of measuring stage 404b. Because the CSYNC signal is still high, the high signal propagates through measuring stage 404b, and is delayed further by the amount d. After a time period of 2d, the high signal appears at the input of the third measuring stage 404c.

The CSYNC signal is still high, the VCC signal propagates through measuring stage 404c, and generates a high m1 measurement signal, after a time period of 3d. This continues for the time period of 4d, resulting in an active m2 measurement signal, and a time period of 5d, resulting in an active m3 measurement signal. However, between the time 5d and 6d, the CSYNC signal returns low. This prevents the high signal level from propagating any further down the chain of measuring stages (404a–404n). Thus, the measurement signals m4–m12 remain inactive (low). In this manler, the measuring section 400 generates a series of high measurement signals reflecting the duration of the CLKX signal.

Figure 5:
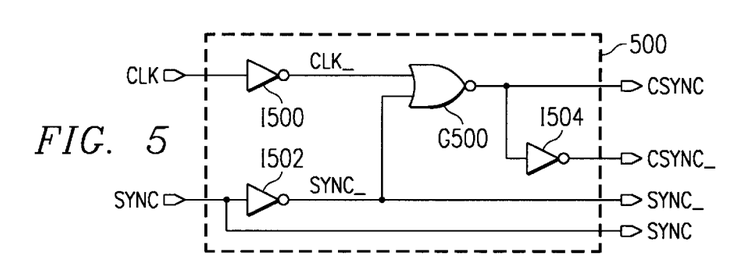
FIG. 5 is a schematic diagram illustrating a timing control circuit of the preferred embodiment.

Referring now to FIG. 5, a schematic diagram is set forth illustrating a timing control circuit according to the preferred embodiment. The timing control circuit is designated by the general reference character 500, and represents one possible implementation of the timing control circuit shown as 402 in FIG. 4. The timing control circuit 500 includes a first inverter I500 that generates a CLK_ signal as one input to a two-input NOR gate G500. In a similar fashion, the SYNC signal is received by an inverter I502, which generates the SYNC_ signal. The SYNC_ signal is provided as the second input to gate G500. The output of gate G500 provides the CSYNC signal, which is further inverted by an inverter I504 to generate the CSYNC_ signal.

Figure 6:
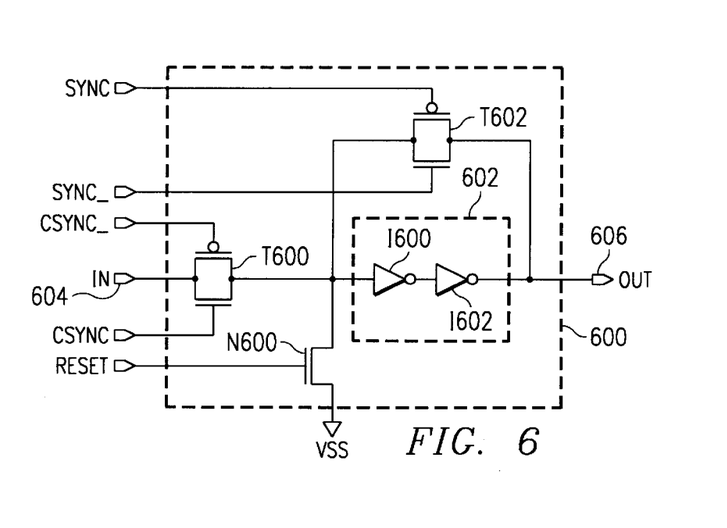
FIG. 6 is a schematic diagram illustrating a measuring stage of the preferred embodiment.

Referring now to FIG. 6, a schematic diagram is set forth illustrating a measuring stage according to the preferred embodiment. The measuring stage is designated by the general reference character 600, and represents one possible implementation of one of the measuring stages (404a–404n) shown in FIG. 4. The measuring stage includes a timing gate T600 and delay circuit 602 disposed between an input 604 and an output 606. The timing gate T600 is a complementary metal-oxide-semiconductor (CMOS) transmission gate that receives the CSYNC signal at the gate of its n-channel transistor, and the CSYNC_ signal at the gate of its p-channel transistor. Therefore, when CSYNC and CSYNC_ are active (high and low, respectively) the input 604 is coupled to the delay circuit 602. The delay circuit 602 includes two inverters, I600 and I602, arranged in series. A feedback gate T602 is coupled between the input of inverter I600 and the output of inverter I602. In addition, the input to inverter I600 is coupled to the low power supply voltage VSS by a discharge transistor N600. It is noted that the measuring stage 600 is composed of digital circuit elements providing for easy integration into many manufacturing processes and reduced noise.

Figure 7:
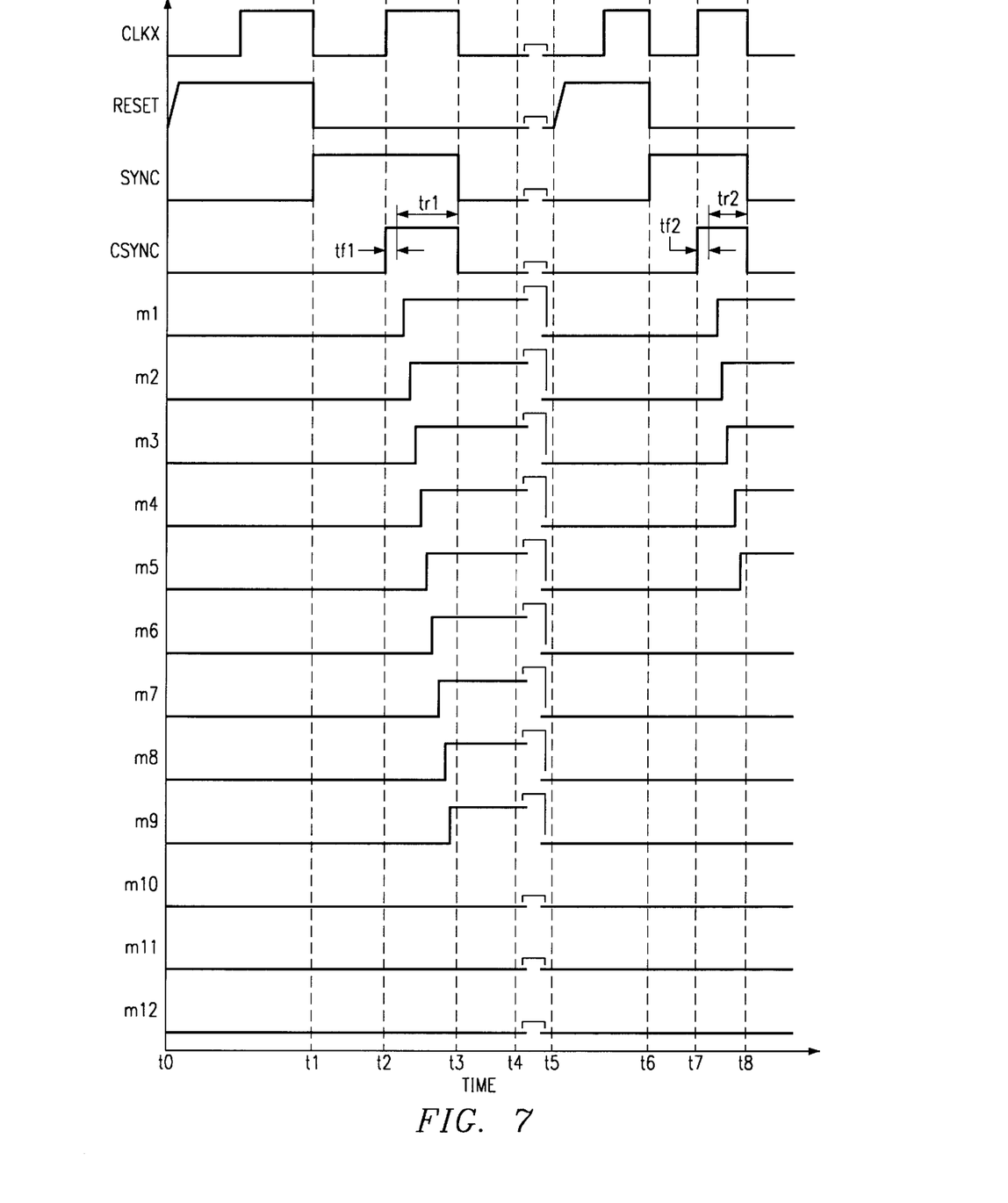
FIG. 7 is a timing diagram illustrating the operation of the measuring section of the preferred embodiment.

Referring now to FIG. 7, a timing diagram is set forth illustrating the operation of the preferred embodiment measuring section 400. The timing diagram illustrates the operation at a first clock frequency, between times t0 and t4, and a second clock frequency, between times t5 and t8. The second clock frequency is faster than the first clock frequency. FIG. 7 illustrates the CLKX, RESET, SYNC, and CSYNC signals. In addition, the resulting measurement signals (m1–m12) are also illustrated. At time t0, the clock circuit is reset, resulting in the RESET pulse going high for a first clock period. Referring to FIG. 6, with the SYNC signal low, transfer gate T602 is turned on, coupling the output of inverter I602 to the input of inverter I600. At the same time, the RESET signal is high, turning on transistor N600, and thus coupling the nodes within the measuring stage 600 to VSS.

Referring again to FIG. 7 in conjunction with FIG. 6, the first clock period ends at time t1, resulting in the RESET signal returning low and the SYNC signal going high. With the SYNC signal high, transfer gate T602 within the measuring stages 600 is turned off, isolating the output of inverter I602 from the input of inverter I600. With the RESET signal low, transistor N600 is turned off. Referring to FIG. 5, with SYNC signal high, a low SYNC_ signal will be applied to one input of gate G500 within the timing control circuit 500. Initially the other input to gate G500 (CLKX_) is high, and the CSYNC signal remains low.

At time t2, the CLKX signal goes high, and the CLKX_ signal within the timing control circuit 500 goes low. This results in gate G500 driving the CSYNC signal high. If reference is made once again to FIG. 6, with the CSYNC signal high, the input transfer gate T600 within each measuring stage 600 is turned on, allowing signals to propagate through, and be delayed by the measuring stage 600.

Referring back to FIG. 4 in conjunction with FIG. 7, when CSYNC goes high at time t4, the high VCC signal applied to the input of measuring stage 404*a* begins propagating through the series of measuring stages (404*a*–404*n*), with each measuring stage (404*a*–404*n*) introducing a delay. In the particular example illustrated between times t0 and t4, the signal manages to propagate through measuring stages 404*a*–404*k*. This results in the signals m1–m9 being driven high, after consecutively longer delays.

At time t3, before the VCC timing signal has reached measuring stage 404*l*, the CSYNC signal returns low, turning off the input transfer gate within measuring stage 404*l*. This prevents the high VCC signal from propagating any further down the series of measuring stages (404*a*–404*n*), resulting in the m10–m12 signals remaining low. Thus, in operation, the measuring section 400 has a set of ordered measurement signals (m1 being the first in order, m12 being the last in order) of which a consecutive set of signals are activated to indicate the duration of the system clock signal.

An alternate way of conceptualizing the operation of the measuring section 400 is to consider the first two measuring stages 404*a* and 404*b* as a fixed delay stage, and the remaining measuring stages (404*c*–404*n*) as signal stages. The fixed delay stage (404*a* and 404*b*) introduces a fixed delay into the timing signal. Thus, for an initial fixed portion of the CSYNC signal (the half-cycle portion of the CLKX signal that is measured by the measuring section 400) no measurement signals are generated. However, following this initial fixed delay, the signal stages (404*c*–404*n*) will provide measurement signals which reflect the duration of the remaining portion of the CSYNC signal. It is understood that fixed portion remains fixed, regardless of the CLKX frequency, while the remaining portion will be shorter as the CLKX frequency increases, or longer as the CLKX frequency decreases. Thus, the measuring stage 400 can be considered to divide the CSYNC pulse (and hence the CKLX half-cycle) into a fixed portion and remaining portion tlrough the operation of the fixed delay stage (404*a* and 404*b*). The duration of the remaining portion is then measured by operation of the signal stages (404*c*–404*n*). "Fixed" portions are shown in FIG. 7 as tf1 and tf2, and corresponding "remaining" portions are shown in FIG. 7 as tr1 and tr2, respectively.

Referring back to FIG. 6, it is also noted that at time t3, the SYNC signal returns low, turning on the transfer gates T602 within each measuring stage 600. This helps maintain the logic levels of the measurement signals (m1–m12) by forming latches within each measuring stage 600. For example, referring back to FIG. 4, in the example shown by times t0–t4, measuring stages 404*a*–404*k* will latch high values, while measuring stages 404*l*–404*n* will latch low values.

Time t4 designates the end of the first example of operation. It is noted that the measurement signals (m1–m12) are generated on the last half of the second clock cycle. Thus, the preferred embodiment uses a first clock cycle (between times t0 and t1) to discharge the measuring stages (404*a*–404*n*), and then a second clock cycle (between times t1 and t3) to measure the duration of the clock cycle. It is understood that while the preferred embodiment actually measures a half-cycle of the CLKX signal, a pulse could be generated to measure the full length of the clock cycle. The system clock has a 50% duty cycle, and the remaining portion of the system clock period is a half-cycle.

A second example of the operation of the preferred embodiment is set forth in FIG. 7 between times t5 and t8. The second example illustrates a CLKX signal having a faster frequency than that of the first example. As a result, when the CSYNC signal goes high at time t7, its duration is shorter than the previous example. Consequently, the high VCC signal that begins at measuring stage 404*a* will only have time to propagate through measuring stages 404*a*–404*g*, with the input transfer gate within measuring stage 404*h* turning off at time t8, and preventing the high signal from continuing through the remainder of the measuring stages 404*h*–404*n*. This results in measurement signals m1–m5 going high, and measurement signals m6–m12 remaining low. Thus, a faster CLKX frequency results in a smaller number of consecutive measurement signals.

The fixed portion of the second example, tf2, has the same duration at that of the first example (tf1). However, the remaining portion tr2 of the second example is smaller than that of the first example (tr1).

If the delay introduced into the timing signal by each measurement stage (404*a*–404*n*) is considered as a time segment, the measurement section 400 can be conceptualized as measuring the remaining portion of the CSYNC pulse (that portion which follows the fixed delay established by measurement stages 404*a* and 404*b*) as a multiple of time segments. Thus, in the first example set forth between times t0 and t4 in FIG. 7, the duration of the remaining portion of the CSYNC signal (and hence the remaining portion of the CLKX half-cycle) can be considered to be nine time segments, and nine consecutive measurement signals are activated. In the second example, the duration of the remaining portion of the CSYNC pulse is five time segments.

Figure 8:
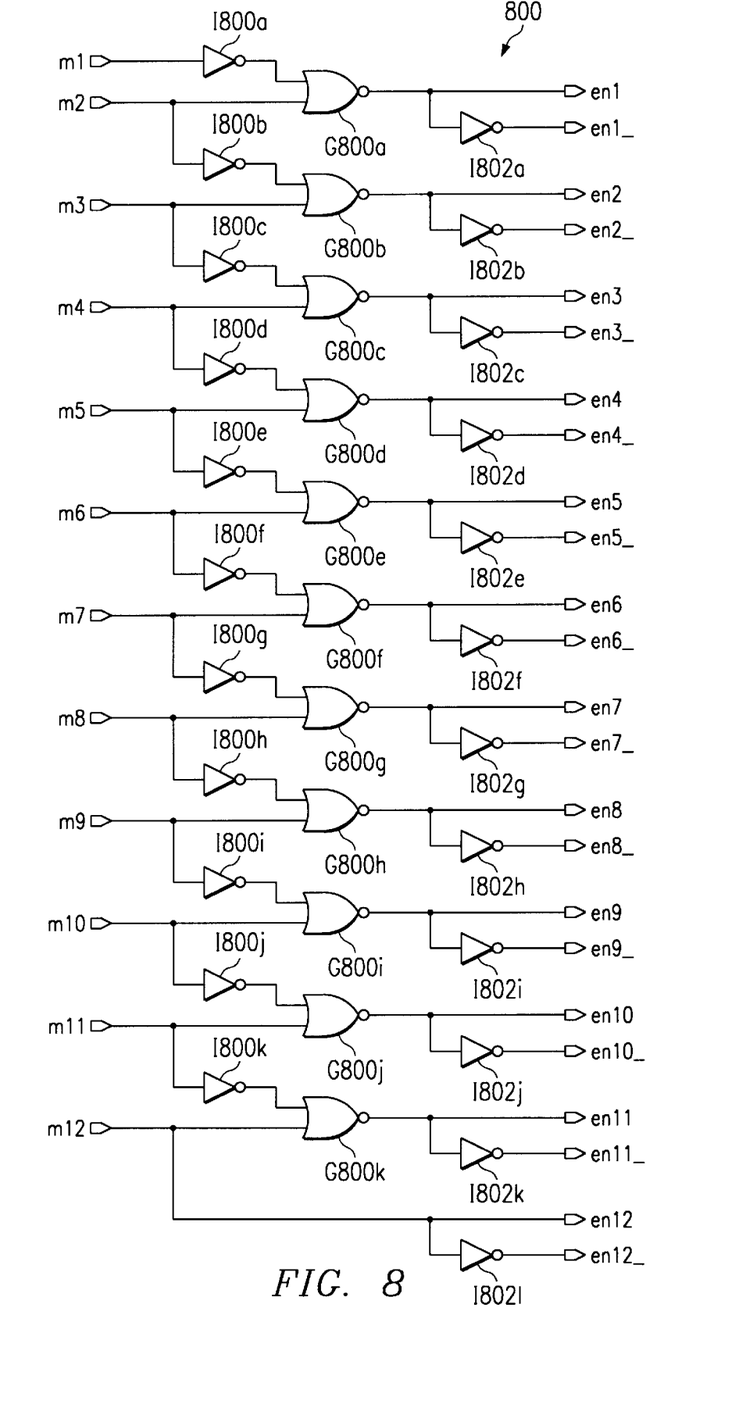
FIG. 8 is a schematic diagram illustrating a logic section of the preferred embodiment.

Referring now to FIG. 8, a schematic diagram is set forth illustrating a logic section of the preferred embodiment. The logic section is designated by the general reference character 800, and may be used as the logic section shown as 204 in FIG. 2. The logic section receives a set of measurement signals (m1–m12) and in response thereto, activates one of a number of enabling signals (en1–en12). In the preferred embodiment, the enabling signals are provided in complementary pairs. The measurement signals (m1–m11) are inverted by an associated inverter (I800*a*–I800*k*) to provide one input to an associated two-input NOR gate (G800*a*–G800*k*). Each NOR gate (G800*a*–G800*k*) receives the next consecutive measurement signal as a second input. For example, gate G800*a* receives the m1_ signal and m2 signal, and gate G800*b* receives the m2_ signal and m3 signal. The m12 signal is used to generate an en12 signal. This signal is inverted by inverter I802*l* to generate an en12_ signal.

The output of each gate G800*a*–G800*k* provides one of the enabling signals (en1–en11). Each of these outputs is further inverted by an associated output inverter (I802*a*–I802*k*) to provide corresponding complementary enabling signals (en1_–en11_). In the preferred embodiment, the various circuits of the logic section 800 are digital providing for the increased noise immunity and increased ease of integration noted above.

The logic section 800 detects the transition between an initial set of consecutive high measurement signals and the remaining set of low measurement signals. This transition is used to activate an enabling signal that is reflective of the duration of the CLKX period. This operation is set forth in a timing diagram in FIG. 9.

Figure 9:
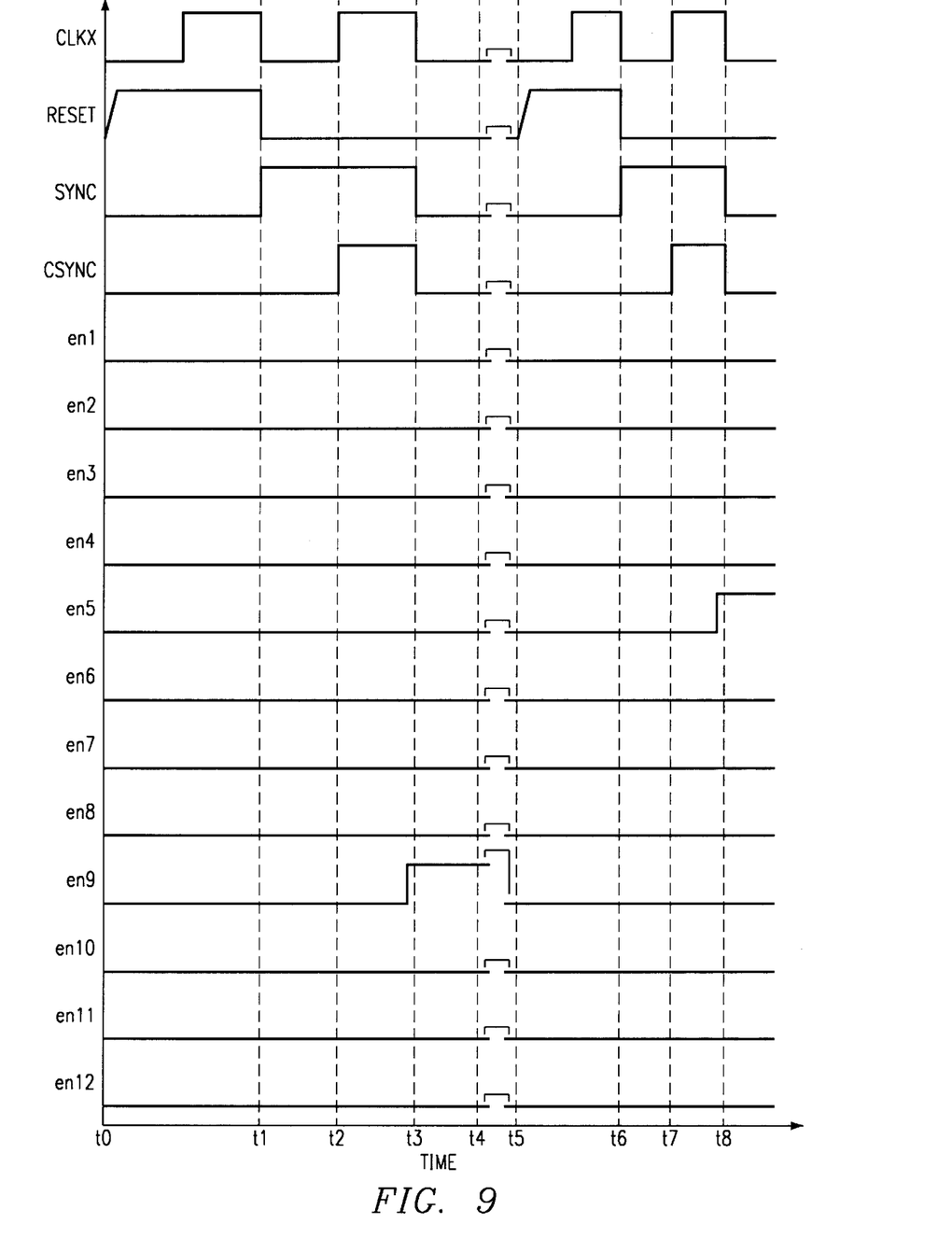
FIG. 9 is a timing diagram illustrating the operation of the logic section of the preferred embodiment.

FIG. 9 illustrates the response of the logic section for the same two examples set forth in FIG. 7. As shown in FIG. 7, in the first example (between time t0 and t4) measurement signals m1–m9 are driven high, while signals m10–m12 remain low. The logic section 800 detects the change in measurement values between signal m9 and m10, resulting in an active en9 signal. Referring now to FIG. 8 in conjunction with FIG. 7, gates G800a–G800h have inputs that are initially at opposite logic stages. When the m1–m9 signals all transition high, the inputs to same gates G800a–G800h switch to complementary values. Thus the outputs of gates G800a–G800h remain low. Similarly, gates G800j and G800k have inputs which remain at opposite logic states, and never transition. Thus, the outputs to gates G800j and G800k also remain low.

In contrast to the other gates of the logic section 800, in the first example, gate G800i receives an input from inverter I800i that is initially high, then transitions low, while its other input (signal m10) remains low. This results in the output of gate G800i (signal en9) transitioning high.

For the second example of FIG. 7, shown between times t5–t8, gates G800a–G800d will have inputs that transition between complementary values, while gates G800f–G800k will have inputs that remain at complementary values. Thus, the outputs of these gates (en1–en4 and en6–en11) remain low, as set forth in FIG. 9. Because the duration of the CLKX cycle in the second example is shorter than that of the first example, it is the gate G800e that has one input that remains low (m6) and one input that transitions low (output of inverter I800e). This results in the en5 signal goes high. In this manner a particular enable signal (en1–cn12) is activated in response to a given set of measurement signals.

Figure 10:
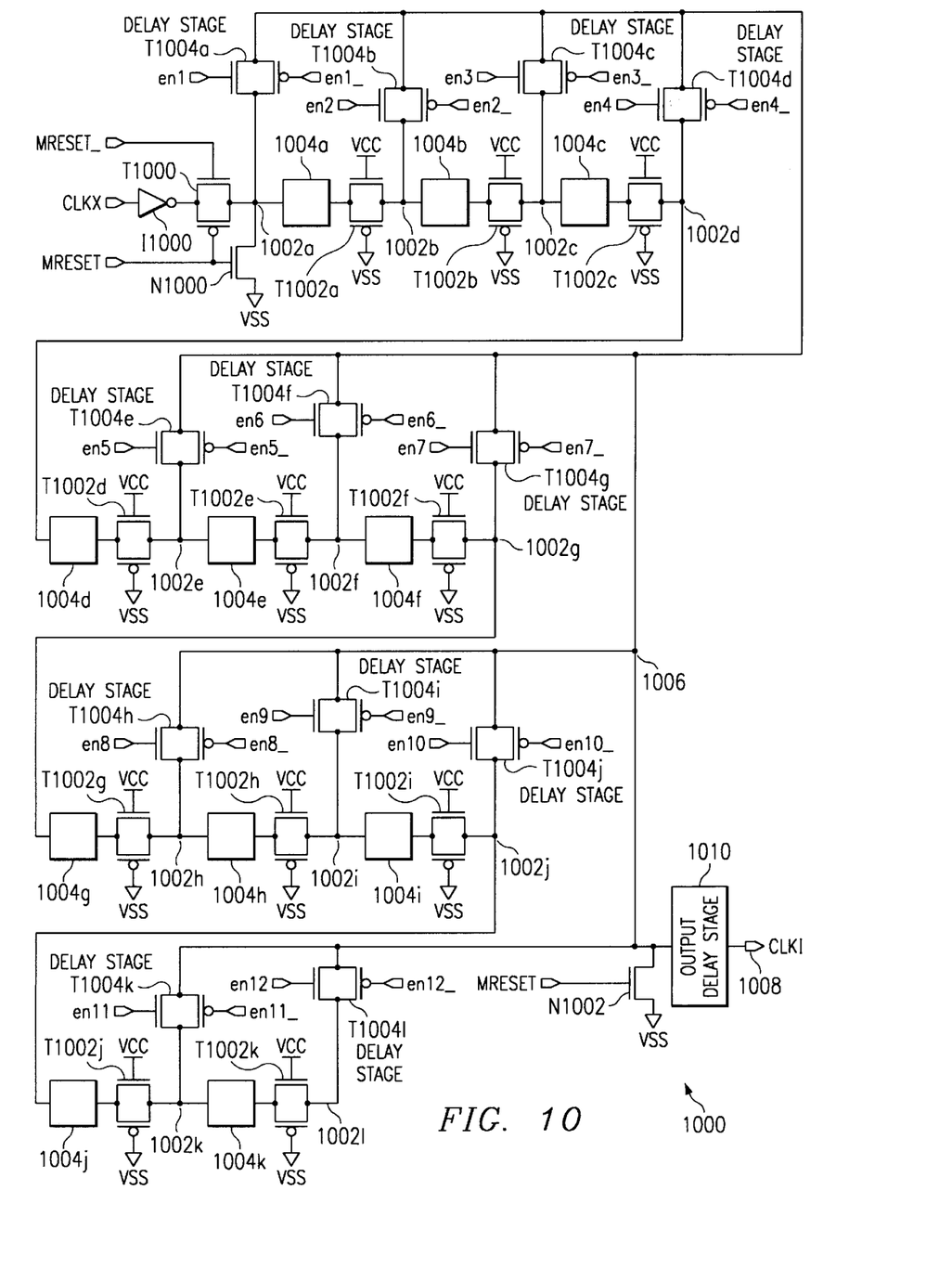
FIG. 10 is a schematic diagram illustrating a generating section of the preferred embodiment.

FIG. 10 sets forth a schematic diagram of a generation section of the preferred embodiment. The generation section is designated by the general reference character 1000, and can be used as the generation section 206 in FIG. 2. The generation section 1000 includes an input inverter I1000, which inverts the CLKX signal to generate a CLKX_ signal. The CLKX_ signal is received by CMOS transfer gate T1000. The p-channel device of gate T1000 receives the MRESET signal and the n-channel device of gate T1000 receives the inverse of the MRESET signal (MRESET_). The output of gate T1000 is coupled to a first signal node 1002a. The signal node 1002a is further coupled to the power supply voltage VSS by an n-channel reset transistor N1000. Transistor N1000 is enabled by the MRESET signal going high.

Signal node 1002a forms the first of a series of signal nodes, shown as 1002a–1002l. Each of the signal nodes is separated from one another by an associated delay stage (1004a–1004k) and a corresponding transfer gate (T1002a–T1002k). The delay stages (1004a–1004k) serve to introduce a delay into the CLKX_ signal received by transfer gate T1000. In this manner, when gate T1000 is turned on, a clock signal is provided at each signal node (1002a–1002l), which is a delayed version of the CLKX_ signal. The further down the series a signal node is, the greater the delay introduced into the signal (i.e., signal node 1002a has the least delay, signal node 1002l has the most delay).

Each signal node (1002a–1002l) is coupled to a common clock node 1006 by an associated CMOS select transfer gate (T1004a–T1004l). Further, each of the select transfer gates (T1004a–T1004l) is turned on by one of the enable signals (en1–en12). As will be recalled, one of the enable signals is activated by the logic section according to the duration of the CLKX cycle. The common clock node 1006 is further coupled to the VSS power supply by a second reset transistor N1002, that is also enabled by the MRESET signal. The common clock node 1006 is coupled to an output node 1008 by an output delay stage 1010. The output delay stage 1010 provides the phase shifted internal clock signal CLKI.

In the preferred embodiment, the generation section 1000 delay stages (1004a–1004k and 1010) have the same configuration as the delay circuit 602 of the measuring stage, and so introduce the same amount of delay. Further, as in the case of the measuring section circuits (500 and 600) and logic section 800, the generation section 1000 circuit members are digital, for increased noise immunity and ease of integration.

Referring back to FIG. 3, it is recalled that in a reset operation, the MRESET signal rises high for two clock cycles. This operation results in transfer gate T1000 turning off, and transistors N1000 and N1002 turning on, pulling all of the signal nodes (1002a–1002l) to the VSS level.

Figure 11:
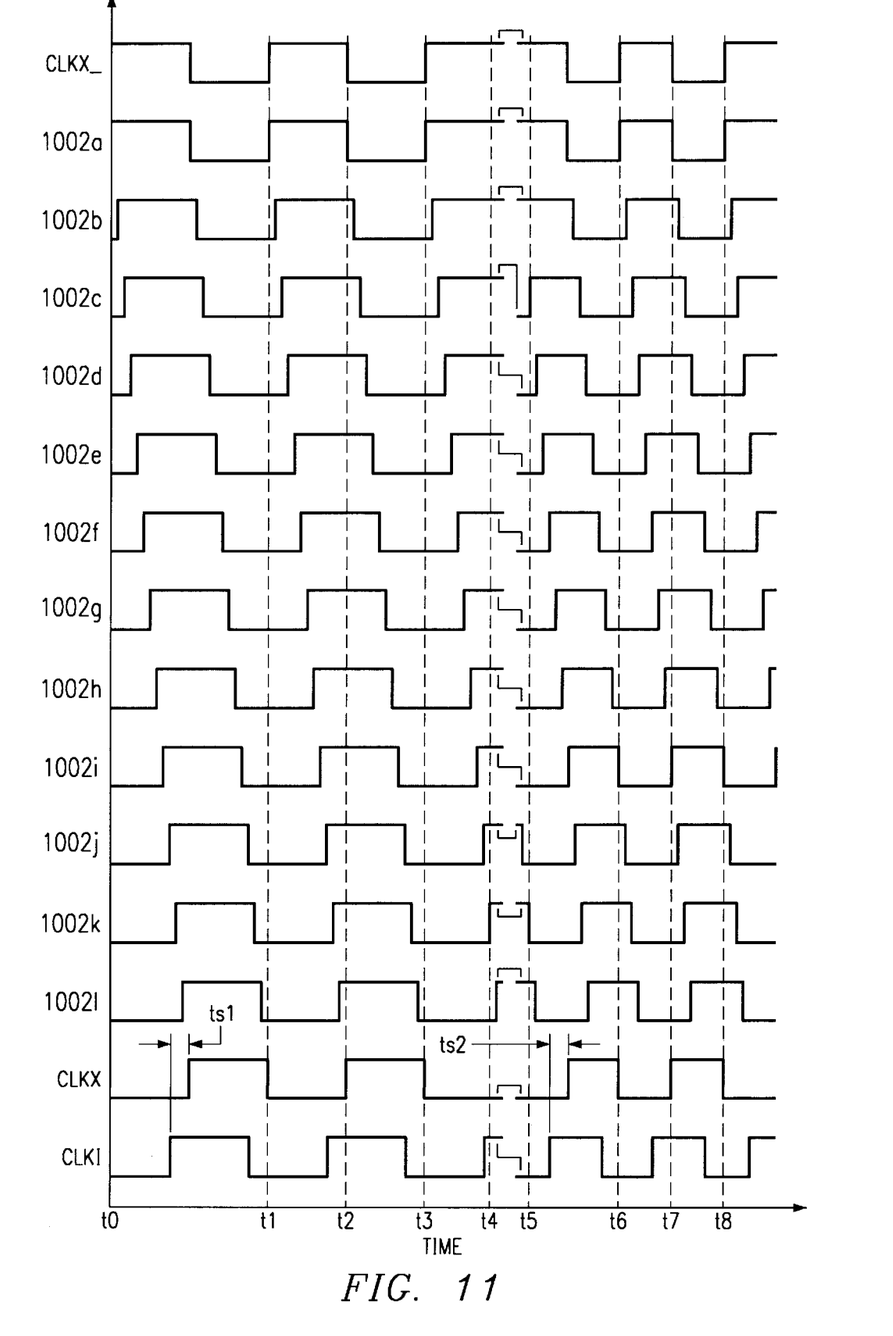
FIG. 11 is a timing diagram illustrating the response of the generating section for a first system clock frequency and a second system clock frequency.

Referring now to FIG. 11, the response of the generation section 1000 for two different clock frequencies is set forth in a timing diagram. The response of FIG. 11 corresponds to the responses shown in FIGS. 7 and 9. In FIG. 11, the first response is shown between times t0 and t4. The second response (a faster clock frequency) is shown between times t5 and t8. FIG. 11 sets forth the CLKX_ signal received by the transfer gate T1000, and the response of each signal node (1002a–1002l). In addition, the CLKX signal and the resulting CLKI signal are set forth to illustrate the resulting phase shift.

Referring now to FIG. 10 in conjunction with FIG. 9, it is shown that in the first example, the enabling signal en9 is activated (goes high). This results in signal node 1002i being coupled to the common clock node 1006, and being delayed by the delay stage 1010 to generate the CLKI signal. The phase shift between the CLKX signal and the CLKI signal is the time period shown as "ts1" in FIG. 11. In the second example, due to the shorter clock period, it is the enS signal that is activated. When the en5 signal is activated, the signal node 1002e is coupled to the common clock node 1006, to provide the CLKI signal. As shown in FIG. 11, in the second example, the phase shift between the CLKX and CLKI signal is shown as the time period "ts2." This phase shift is the same as the phase shift of the first example (i.e., ts1 is generally equal to ts2). In this manner, despite variations in the system clock frequency, a constant phase shift can be established, resulting in predictable synchronous device operation over a range of system clock frequencies.

It is understood that while the present invention has been described in terms of a detailed preferred embodiment, various changes, substitutions, and alterations could be made without departing from the spirit and scope of the invention. Accordingly, the present invention is intended to be limited only as defined by the appended claims.

What is claimed is:

1. A clock circuit, comprising:
a measuring section that receives a system clock signal and provides a plurality of measurement signals, the measuring section activating a predetermined number of measurement signals according to the frequency of the system clock signal;
a logic section that receives the measurement signals and provides a plurality of enabling signals, the logic section activating at least one enabling signal according to particular combinations of activated measurement signals; and
a generation section that receives the plurality of enabling signals and the system clock signal, and generates an internal clock signal that is shifted in phase with respect to the system clock signal, the amount of phase shift being generally independent of the system clock signal frequency.

2. The clock circuit of claim 1, wherein:
the measuring section includes a first measuring stage that receives a timing signal and a plurality of subsequent measuring stages arranged in series with the first measuring stage, the measuring stages being enabled for a predetermined portion of an initial system clock signal period,
each measuring stage, when enabled, allowing the timing signal to propagate therethrough and delaying the timing signal by a predetermined delay to generate one of the measurement signals, and
each measuring stage, when disabled, preventing the propagation of the timing signal through subsequent measuring stages.

3. The clock circuit of claim 2, wherein:
each measuring stage includes a series arrangement of inverters that introduced the predetermined delay into the timing signal.

4. The clock circuit of claim 2, wherein:
each measuring stage includes a stage input gate, a stage output node, and a stage delay circuit coupled between the stage input gate and the stage output node, the stage input gate of a measuring stage being coupled to the output node of a previous measuring stage in the series, the stage input gate of the first measuring gate receiving the timing signal and being enabled by the predetermined portion of an initial system clock signal period, and
the output nodes of a plurality of measuring stages providing one of the measurement signals.

5. The clock circuit of claim 4, wherein:
each stage input gate includes a transmission gate formed from parallel complementary insulated gate field effect transistors (IGFETs).

6. The clock circuit of claim 2, wherein:
the system clock signal has an initial clock period having a low portion and a high portion, the predetermined portion of the system clock signal period being the high portion.

7. The clock circuit of claim 1, wherein:
the measurement signals have an order, and the measuring section activates a consecutive number of measurement signals according to the frequency of the system clock signal; and
the logic section compares measurement signals with the previous measurement signal in the order to generate an enabling signal.

8. The clock circuit of claim 7, wherein:
the logic section includes a plurality of NOR gates, each gate receiving one of the measurement signals at one input, and the inverse of a previous measurement signal in the order at the other input.

9. The clock circuit of claim 1, wherein:
the generation section includes
a plurality of delay circuits arranged in series, the delay circuits receiving and delaying the system clock signal to provide a plurality of delayed clock signals, and
a plurality of clock gates coupling each of the delayed clock signals to a common clock node, each clock gate being enabled by a particular active enabling signal.

10. The clock circuit of claim 9, wherein:
each delay circuit of the generation section includes a series arrangement of inverters.

11. The clock circuit of claim 9, wherein:
each clock gate includes a transmission gate formed from parallel complementary insulated gate field effect transistors (IGFETs).

12. A timing circuit for a synchronous integrated circuit device for providing an internal clock signal that is phase shifted with respect to a system clock, the timing circuit comprising:
a measuring section that apportions the system clock period into a fixed portion and a remaining portion, the fixed portion having a predetermined duration, the measurement section further generating a measurement indication representative of the duration of the remaining portion of the system clock period;
a generation section coupled to the measuring section, the generation section receiving the system clock and the measurement indication, the generation section including
an input buffer that buffers the system clock to generate a buffered system clock,
a plurality of delay circuits coupled to the input buffer, the delay circuits providing a set of delayed clock signals that are increasingly delayed with respect to the buffered system clock, and
a plurality of clock gates, each clock gate coupling one of the delayed clock signals to a common clock node according to the measurement indication.

13. The timing circuit of claim 12, wherein:
the measuring section includes a plurality of measuring stages, each measuring stage measuring a time period of a particular duration and activating an associated measurement signal when the remaining portion of the system clock period is longer than its respective time period, the measurement signals collectively providing the measurement indication.

14. The timing circuit of claim 13, wherein:
the measuring stages measure their respective time periods as multiples of a time segment.

15. The timing circuit of claim 14, wherein:
the measuring stages are arranged in series, with a first measuring stage receiving a timing signal, and each measuring stage introducing a delay into the timing signal that is equivalent to the time segment.

16. The timing circuit of claim 12, wherein:
the measuring section includes
a fixed delay stage that receives a timing signal, and delays the timing signal for predetermined duration, and a plurality of signal stages arranged in series with the fixed delay stage, each signal stage delaying the timing signal, and providing the delayed timing signal as one of the measurement signals.

17. The timing circuit of claim 16, wherein:

the system clock signal period is divided into two half-cycles; and each signal stage includes a signal gate that couples its respective delayed timing signal to a measurement signal output, the signal gates being commonly enabled during one of the half-cycles of the system clock period.

18. The timing circuit of claim 16, wherein:

the timing signal propagates along a timing signal path that includes the fixed delay stage and signal stages, the timing signal path consisting of digital circuit elements.

19. The timing circuit of claim 12, further including:

the measurement indication including a plurality of measurement signals each having an active and inactive state, the number of active measurement signals being dependent upon the duration of the remaining portion of the system clock period;

a logic section coupling the measurement section to the generating section, the logic section providing a plurality of enabling signals to the clock gates of the generating section, and activating a particular enabling signal according to the number of active measurement signals; and each of the clock gates within the generating section is enabled by the activation of a particular enabling signal.

20. The timing circuit of claim 19, wherein:

the logic section consists of digital circuit elements.

21. The timing circuit of claim 12, wherein:

the delay circuits consist of digital circuit elements.

22. The timing circuit of claim 12, wherein:

the clock gates consist of digital circuit elements.

23. The timing circuit of claim 12, wherein:

the measuring section measures the duration of the remaining portion of the system clock period as a multiple of time segments, each of a predetermined duration; and each delay circuit within the generating section delays the buffered system clock signal by an amount equivalent to one time segment.

24. In a clock circuit for a synchronous semiconductor integrated circuit, a method for generating an internal clock signal having a substantially constant phase shift, the method comprising the steps of:

dividing a portion of a system clock period into a fixed portion, that does not vary with the system clock frequency, and a remaining portion;

measuring the duration of the remaining portion;

phase shifting the system clock to generate a shifted system clock; and delaying the shifted system clock according to the measured duration of the remaining portion, to generate a phase shifted internal clock.

25. The method of claim 24, wherein:

the remaining system clock has a 50% duty cycle, and the portion of the system clock period is a half-cycle.

26. The method of claim 24, wherein:

the step of dividing a portion of a system clock period includes activating a timing signal at the start of the portion of the system clock period and delaying the timing signal by the fixed portion; and the step of measuring the duration of the remaining portion includes activating measurement signals during the portion of the system clock period when the delayed timing signal is active.

27. The method of claim 24, wherein:

the step of measuring the duration of the remaining portion includes activating a different measurement signal at generally constant time segment intervals during the remaining portion.

28. The method of claim 24, wherein:

the step of delaying the shifted system clock includes
generating a plurality of delayed system clocks, each delayed system clock being delayed by a different amount with respect to the shifted system clock, and
selecting one of the delayed system clocks as the phase shifted internal clock signal according to the measured duration of the remaining portion.

29. The method of claim 24, wherein:

the step of measuring the duration of the remaining portion includes
providing a plurality of measurement signals having an order, and activating a number of consecutive measurement signals in the order according to the duration of the remaining portion,
providing an enabling signal for each consecutive pair of measurement signals,
activating an enabling signal when its pair of measurement signals includes an active measurement signal and an inactive measurement signal, and
delaying the shifted system clock according to which enabling signal is activated.

* * * * *